(12) United States Patent
Sisk (10) Patent No.: US 8,087,816 B2
(45) Date of Patent: Jan. 3, 2012

(54) AERATOR DEVICE INDUCING CYCLONIC FLOW

(75) Inventor: David E. Sisk, Bonne Terre, MO (US)

(73) Assignee: Bulk Tank Inc., Park Hills, MO (US)

( * ) Notice: Subject to any disclaimer, the term of this patent is extended or adjusted under 35 U.S.C. 154(b) by 594 days.

(21) Appl. No.: 12/242,200

(22) Filed: Sep. 30, 2008

(65) Prior Publication Data

US 2009/0145514 A1   Jun. 11, 2009

Related U.S. Application Data

(60) Provisional application No. 61/012,883, filed on Dec. 11, 2007.

(51) Int. Cl.
*B01F 13/02*   (2006.01)

(52) U.S. Cl. ........................ 366/101; 222/195

(58) Field of Classification Search .............. 366/101, 366/106–107, 3, 10, 136–137, 165.1; 222/195
See application file for complete search history.

(56) References Cited

U.S. PATENT DOCUMENTS

| | | | | |
|---|---|---|---|---|
| 3,343,888 A * | 9/1967 | Anderson et al. | ............. | 406/138 |
| 3,862,707 A * | 1/1975 | Reiter | ............. | 366/101 |
| 3,929,261 A * | 12/1975 | Solimar | ............. | 222/195 |
| 3,952,956 A * | 4/1976 | Steele | ............. | 239/289 |
| 4,030,755 A * | 6/1977 | Heimke | ............. | 406/86 |
| 4,172,539 A * | 10/1979 | Botkin | ............. | 222/195 |
| 4,215,081 A * | 7/1980 | Brooks | ............. | 261/122.1 |
| 4,394,966 A * | 7/1983 | Snyder et al. | ............. | 239/127 |
| 4,556,173 A * | 12/1985 | Pausch et al. | ............. | 239/533.13 |
| 4,662,543 A * | 5/1987 | Solimar | ............. | 222/195 |
| 4,820,052 A * | 4/1989 | Krysel | ............. | 366/101 |
| 5,017,053 A * | 5/1991 | Sisk | ............. | 406/138 |
| 5,129,553 A * | 7/1992 | Becker | ............. | 222/195 |
| 5,139,175 A * | 8/1992 | Krysel et al. | ............. | 222/195 |
| 5,381,606 A * | 1/1995 | Solimar | ............. | 34/585 |
| 5,988,867 A * | 11/1999 | Sisk | ............. | 366/101 |
| 6,007,234 A * | 12/1999 | Steele | ............. | 366/101 |
| 6,170,976 B1 * | 1/2001 | Sisk | ............. | 366/101 |
| 7,350,962 B2 * | 4/2008 | Kao et al. | ............. | 366/165.2 |
| 2009/0145514 A1 * | 6/2009 | Sisk | ............. | 141/67 |

FOREIGN PATENT DOCUMENTS

DE        1909219   *  9/1970
JP       08282785 A  * 10/1996

* cited by examiner

*Primary Examiner* — Charles E Cooley
(74) *Attorney, Agent, or Firm* — Paul M. Denk (57) ABSTRACT

A pneumatic aerator aids in bulk material unloading, handling and transport using tank trailers, hopper cars, and other containers, as its aerator introduces a cyclonic air flow and vibration into the bulk material. This aerator has a housing, one or three guide tubes, an aerator extending through the housing, a gasket upon one end of the aerator generally within the container of the bulk material, and an optional wearplate beneath the gasket. The aerator has a stem with one vane, preferably three vanes, where the vanes and contiguous fins curve counterclockwise in a helical manner. The airflow past the fins and vanes acquires a counterclockwise rotation, rotating the air as it exits radially from the gasket increasing the bulk material unloaded per hour. This aerator also has various gasket thicknesses and edge conditions, guide tubes, and various shapes in the vanes and fins for alternate speeds and directions of airflow. This aerator increases the rate of unloading of bulk materials from tank trailers, hopper cars, and various containers and transporters.

21 Claims, 7 Drawing Sheets

AERATOR DEVICE INDUCING CYCLONIC FLOW

CROSS REFERENCE TO RELATED APPLICATION

This non-provisional application claims priority to the provisional application having Ser. No. 61/012,883 filed on Dec. 11, 2007 and is commonly owned by the same inventor.

This application is related to U.S. Pat. Nos. 5,017,053, 5,988,867 and 6,170,976 from the same inventor.

BACKGROUND OF THE INVENTION

This invention relates generally to bulk material handling, and more specifically pertains to an aerator that pressurizes a storage container and fluidizes bulk material to flow from that storage container into a delivery system. The invention is especially useful for unloading a tank trailer hauling granular bulk material.

The discharge of bulk material granules from a storage chamber can result in blockage of the exit from the storage chamber or other interruptions in the flow of material which cause various conditions such as arching, bridging, "rat-holing" and the like. Storage chambers exist in various types of equipment including hopper trucks, hopper cars, storage silos, bins and other types of industrial storage chambers. When a blockage or interruption of the flow of bulk materials occurs, substantial down time in clearing the discharge opening goes against the storage chamber operator, hauler, or pipeline. Further, substantial loss of bulk material product occurs following incomplete "clean-out" or removal of product from the storage chamber, and contamination may occur after a product load from product remaining from a previous load incompletely cleaned from the storage chamber.

Figure 1:
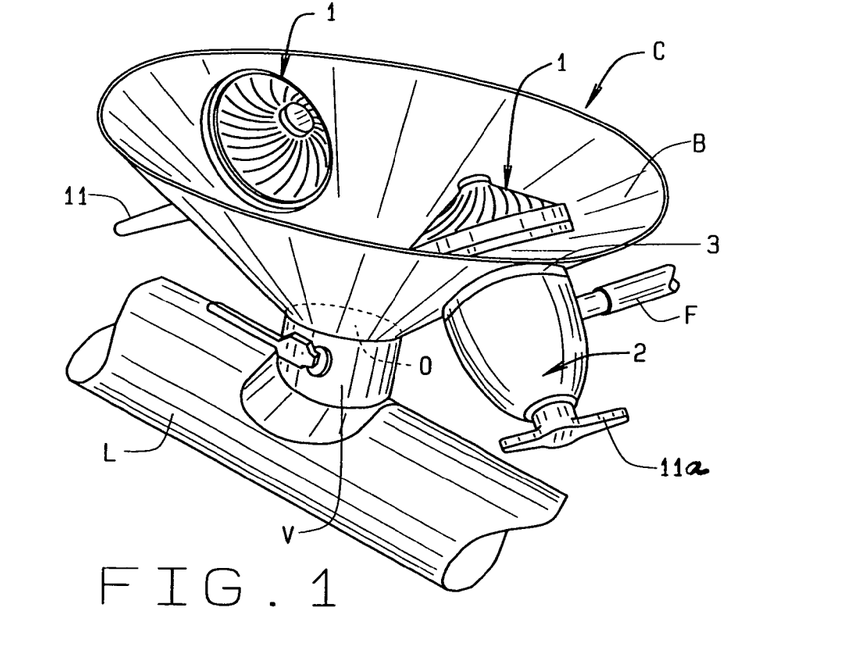
FIG. 1 shows a pair of the present invention installed for unloading a storage container into a line.

The typical environment of the aeration device of the present invention appears in FIG. 1. There, a fragmented portion of the bulk material container, or storage chamber C, includes a downwardly tapering or conically shaped bottom B having a discharge opening O at the lower end of the hopper, or container bottom, B, which leads into a discharge control valve V. The valve controls the discharge of bulk granular material, or the like, from the hopper or storage chamber C for direct discharge beneath the hopper or into a transversely extending discharge line L. The bulk material container C may be used in hopper trucks, hopper cars, storage silos, bins and other types of containers for bulk material storage. Incorporated within the bulk material hopper container C, a plurality of aeration devices 1 mount to the container bottom B a predetermined distance above the discharge opening O. While many of the aeration devices 1 may be used in the bulk material container C, FIG. 1 illustrates two of them in operation.

Figure 2:
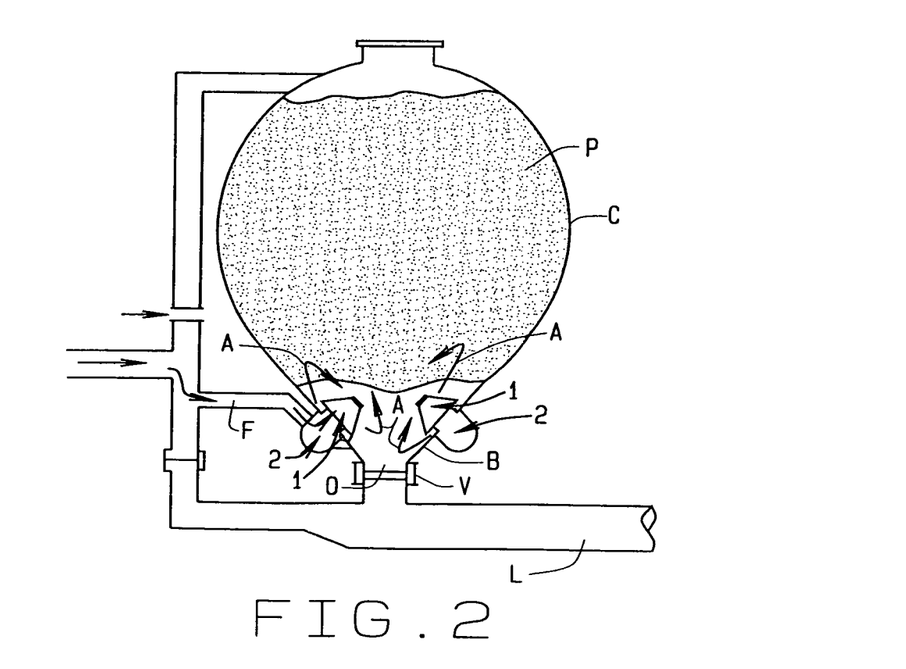
FIG. 2 shows the flow of granular material from a storage container into a line under pressurized air.
Figure 2A:
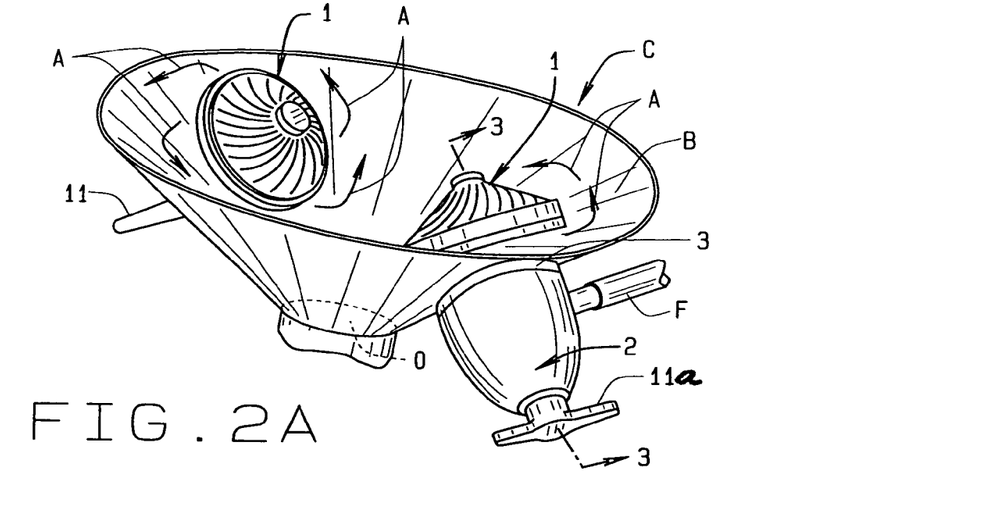
FIG. 2a illustrates the cyclonic flow of air from beneath the gasket as during usage of the invention.

Aeration devices 1 in a bulk hopper container or storage chamber C operate upon air introduced via the air flow line F, at approximately 20 to 25 psi into the aeration devices 1 as shown in FIG. 2 where a gasket flaps and vibrates nearby particles of bulk material. The air then flows out from the gasket of the present invention. Air, shown by arrows A, passes beneath and outwardly from the gasket in a rotation, preferably counterclockwise as in FIG. 2a, to vibrate and secondarily to aerate and to fragment the bulk material particles P. Alternatively, the air flow exits the gasket in a clockwise manner. This aeration thus prevents any blockage or interruption as the bulk material particles P are induced by vibration to flow through the opening O in the bottom B of the bulk material container C.

DESCRIPTION OF THE PRIOR ART

A variety of patents have issued upon various devices to ease the transfer and unloading of bulk granular ingredients for storage and transportation. These long standing issues have inspired various devices for introducing air and waves of air into the bulk material product within the storage chamber to dislodge blockages and ease the flow of bulk material through a discharge opening. The devices used for the above purposes are numerous as shown in the following representative patents.

Previously, the inventor obtained the U.S. Pat. Nos. 5,988,867 and 6,170,976 for a fluidizing device that stimulated flow of granular materials in trailers and containers. This device has a housing affixed to a tank or container wall, preferably a single piece housing. A threaded rod extends through the housing generally perpendicular to the wall. Upon one end outwardly from the wall, a handle connects to the rod. Upon the opposite end, a clip extends from the rod snugly into the aperture in the wall. Above the clip and at the opposite end of the rod, a resilient gasket descends from a boss to the interior of the wall of the tank or container. The gasket abuts a wearplate that protects the gasket from abrading the aluminum interior wall of a tank or other container. The housing has an opening to admit air therein and the pressurized air, about 20 to 25 psi, then induces fluctuations in the gasket which then vibrates the granular product to assist in motion out of a tank or container through a port.

The U.S. Pat. No. 4,662,543 to Solimar describes an aeration device that aerates materials within a container. This device also has a housing upon the wall of a container with a rod extending through an aperture in the wall and connecting with a resilient gasket. The gasket secures upon an aerator stud that connects to a rod. The aerator stud has a substantial cross section reinforced with a shoulder.

The U.S. Pat. No. 5,381,606 also to Solimar provides another aeration device. This device has an aeration skirt connecting to a stem where the stem has American National Standard straight and taper threads in separate sections. This stem permits connection to American and British tapered fittings for supply of air to the aeration device.

Then the U.S. Pat. No. 5,017,053 to Sisk also has an aeration device of slightly different construction. This device has a housing appurtenant to a container and that connects to an air supply. The housing admits a rod with a handle upon one end and threads upon the other end. The threads connect the rod to a hollow body upon a stem. The hollow body enters the container and has a conical shape opposite the stem. The cone has a plurality of apertures for admitting compressed air into the container to vibrate granular material out of the container.

The U.S. Pat. No. 3,929,261 also to Solimar shows an early aeration device supplied by a grain storage company with its products to farmers. This device has a name in the trade of the Butler® Flowcone. This device also has a housing upon a container with a central rod turned by a handle. In this patent, a flexible cone shaped silicone resilient flap mounts over a complementary shaped aluminum casting having an air inlet passageway. The rod connects to a cone locating within the container. The cone has at least two outlets for release of air upon its face beneath the apex. Upon the face of the cone, a resilient flap secures to a flange. Air escaping from the outlets generates fluctuations in the flap for vibrating grain and other granular material proximate the device. This device enhances the aeration of the bulk material so as to ease the flow, or discharge, of the bulk material from the storage chamber.

In a rising fuel cost environment, trucking companies, drivers, and their customers seek to minimize costs at each opportunity. The prior art has developed various devices to aerate bulk material during unloading. Those devices have performed however, the present invention noticeably increases the rate of bulk material unloading. In doing so, the present invention allows a driver to complete an unloading ten to fifteen minutes sooner than before. Faster unloading leads to more satisfied customers and more loads, or hauls, per day, week or month, thus improving revenues to trucking companies.

Further, during unloading of a hopper trailer, the truck remains idling as it provides blower air in some cases. An idling truck often consumes a gallon of diesel fuel per hour. During usage of the invention, unloading raises a truck's engine speed to three times that of ordinary idling, measured in RPM, and consumes three gallons of diesel fuel per hour of unloading. As diesel fuel prices fluctuate in the vicinity of $4 per gallon, reducing idling saves trucking companies a significant expense at least $500 per year during unloading depending on loads per day. The present invention, lowering unloading times noticeably, reduces idling times of trucks thus, leading to fuel cost savings.

SUMMARY OF THE INVENTION

This invention provides a pneumatic aerator for bulk material handling and transport where this aerator in cooperation with its housing introduces vibration along with rotation of air and a cyclonic air flow from beneath the edge of a gasket into the bulk material, typically during unloading of a container such as a tank trailer. This aerator device has a single piece housing, one or three guide tubes, an aerator extending through the housing into a container of bulk material, a gasket upon one end of the aerator generally within the container of the bulk material, and an optional wearplate beneath the gasket and outside of the aerator also within the container. The aerator has a stem with at least one vane, preferably three vanes, and contiguous fins curved in a helical, or spiral, manner and preferably counterclockwise. Existing equipment, such as a blower, provides compressed air that enters housing through an off center intake port, or guide tube, initiating counterclockwise spin of the air stream within the housing. The flow of air past the fins and vanes accelerate the counterclockwise rotation of air. As the rotating air enters the tank hopper, the pressure builds, the air moves faster, and the air acquires more energy as it approaches the aerator rubber gasket. Starting from beneath the gasket, the air moves away from the stem and sweeps radially outward from the gasket thus, increasing the bulk material that unloads within a given time. The lower surface of the rubber gasket further sharpens the rotation of the air so it sweeps the hopper in a counterclockwise manner unlike that shown in the prior art. The aerator also induces vibration in nearby bulk material through oscillating, or flapping, the gasket and then a cyclonic air flow that combine to loosen and to fluidize granular bulk material for transmission out of a container or through a line.

This aerator device also has foreseen variations in the thickness, structure, and material of the gasket, the location, angle, and number of guide tubes of the housing, and the radius of curvature, number, and angle of the vanes and fins upon aerator. The present invention aids in the unloading of bulk materials from various containers and transporters.

It is, therefore, the principal object of this invention is to provide an aerator device for inducing cyclonic flow that increases the rate of unloading bulk materials from a container by approximately twenty percent, where the increase in unloading rate varies by the type of bulk granular material unloaded.

Still another object of this aerator device for inducing cyclonic flow is to reduce fuel and labor costs during unloading and to increase the number of loads hauled by equipment in a limited amount of time.

Still another object of this aerator device for inducing cyclonic flow is to induce vibration in granular bulk material adjacent to a flapping gasket.

Still another object of this aerator device for inducing cyclonic flow is to provide an aerator that causes air flow to sweep the container in the vicinity of the device.

Still another object of this aerator device for inducing cyclonic flow is to provide for increased airflow velocity during aeration that leads to faster unloading of product.

Still another object of this aerator device for inducing cyclonic flow is to provide an aerator that fluidizes granular bulk material, or product, for more rapid unloading from a tank trailer or other container.

Still another object of this aerator device for inducing cyclonic flow is to reduce noticeably the incidence of rat holing and back flushing using a helically vaned stem.

Still another object of this aerator device for inducing cyclonic flow is to prevent back pressure within the container proximate the location of unloading. The positive shutoff of the invention upon the hopper wall dissipates back pressure immediately.

Still another object of this aerator device for inducing cyclonic flow is to withstand operating temperatures up to 350° F.

And, still another object of this aerator device for inducing cyclonic flow is to reduce the lifecycle costs of the device by lessening the demand for replacement parts and service through usage of strong economical components.

These and other objects may become more apparent to those skilled in the art upon review of the summary of the invention as provided herein, and upon undertaking a study of the description of its preferred embodiment, in view of the drawings.

BRIEF DESCRIPTION OF THE DRAWINGS

In referring to the drawings,

FIG. 16 provides a top view of the gasket of the present invention while

The same reference numerals refer to the same parts throughout the various figures.

DESCRIPTION OF THE PREFERRED EMBODIMENT

In referring to the drawings, FIG. 1 shows typical location of the aeration device of the present invention upon a bulk material container. There, a fragmented portion of the bulk material container C, such as a tank trailer, hopper railcar, or other storage chamber, includes a downwardly tapering or conically shaped bottom B having a discharge opening O at the lower end of the hopper, or container bottom, B which leads into a discharge control valve V that releases a controlled rate of bulk granular material, or the like, from the hopper or storage chamber C into a transversely extending discharge line L for distribution into another storage chamber or a transport vehicle. Generally a plurality of aeration devices 1 mount to the container bottom B for effective and symmetric vibration of the bulk materials for unloading from the hopper. While many of the aeration devices 1 may be used, FIG. 1 illustrates two of them in operation.

Aeration devices 1 in a bulk hopper operate upon air introduced via the air flow line F into the aeration devices 1 as shown in FIG. 2. The flow line supplies pressure to the tank, generally near the top of the tank, and to the aeration devices near the bottom of the tank. Generally, the air pressure at the aeration devices is slightly higher than that at the top of the tank. The air then flows out counterclockwise from the aerator device of the present invention as shown by arrows A, then passes beneath and outwardly from a gasket, to vibrate, to aerate and to fragment the bulk material particles P. This aeration thus prevents any blockage, bridging, ratholing, or interruption as the bulk material particles P flow or discharge through the opening O in the bottom B of the bulk material container C.

The present invention has undergone field testing where granular bulk material was unloaded from a tank trailer while timed. The test moved Type 1 Portland Cement from the trailer to the bin. Part one of the test transferred 52,450 pounds of cement from the trailer equipped with prior art aerators. The trailer passed the cement through using the prior art aerators in 32 minutes for a flow rate of 1,639.06 pounds per minute. Part two of the test transferred 52,480 pounds of the same cement through a trailer equipped with aerators of the present invention. This load of cement transferred from the trailer under the action of the aerators of the present invention in 25 minutes for a flow rate of 2,099.20 pounds per minute. The present invention moved approximately 460 pounds per minute more from the trailer than the prior art. The present invention increased flow rate from the trailer approximately 28% over the prior art.

Figure 3:
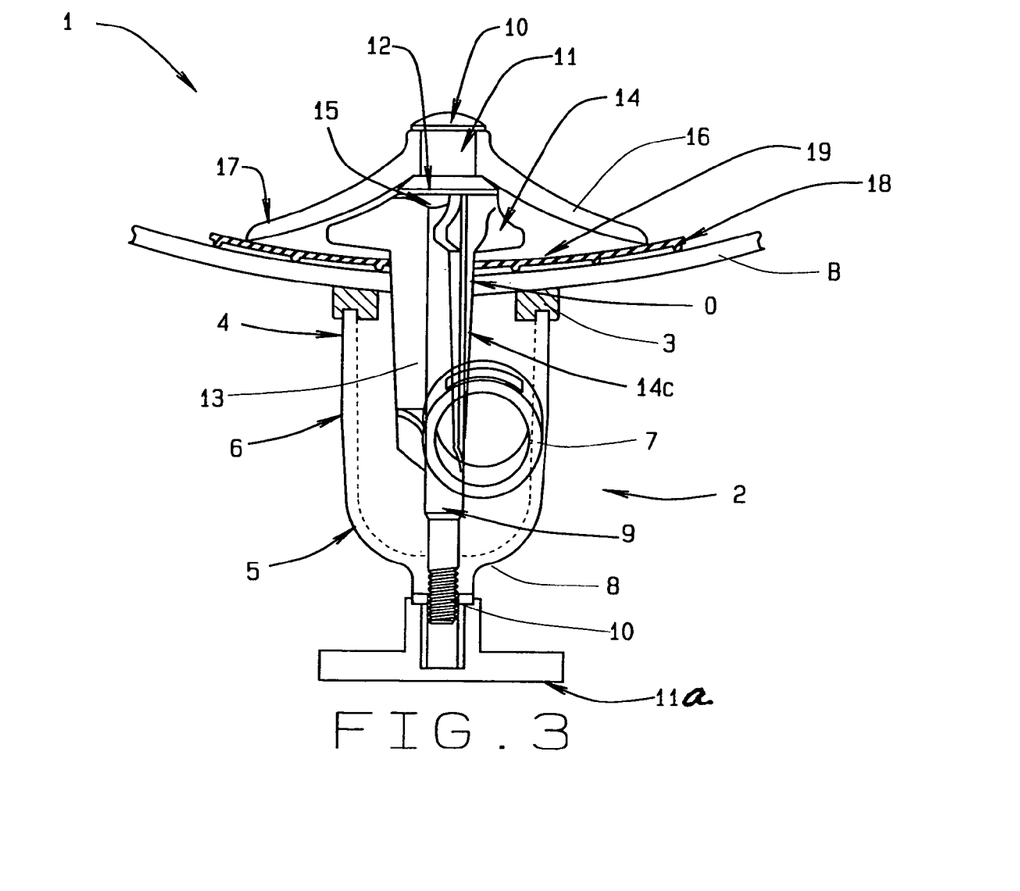
FIG. 3 describes a longitudinal sectional view of the invention.

FIG. 3 shows the present invention installed upon the bottom B of a hopper in a tank trailer or other container in a sectional view revealing the interior of the present invention. The present invention has a housing 2, generally bell shaped, fitted upon a port housing gasket 3 generally round and flexible abutting the bottom B. Upon the port housing gasket, the upper portion 4 of the housing extends outwardly from the container C. The housing has a lower portion 5 beneath a line 6. The lower portion is outwardly from the upper portion and the container. The line extends around the perimeter of the housing upon a plane generally tangent to the container upon an axis through the center of the housing. The line demarks a change in the plane of the surface of the housing to release the housing from a mold during manufacturing. The housing has a guide tube, or an inlet 7, tangent to the exterior of the housing, centered upon the rib, and inclined slightly away from the housing gasket 3. The inlet extends upon both the upper portion and the lower portion. Typically, the inlet has an exterior diameter of approximately 1.5 inches.

The upper portion of the housing has a generally hollow cylindrical form with an open end. The open end abuts the port housing gasket 3 in a pressure fit connection to the bottom B of the hopper of a tank trailer or other container. Opposite the open end, the housing transitions to the lower portion at the line 6. The lower portion has its own general bell shape outwardly from the line 6 that comes to a closed partially spherical end at 8. The lower portion tapers inwardly from the upper portion. The closed end admits the stem 9 into the housing. The stem has a threaded end 10 to which connects a handle 11a, generally a T shape with a threaded opening or embedded brass nut for engaging the threaded end. The inlet 7 is generally inclined towards the handle.

Opposite the threaded end, the description of the stem continues where the stem 9 has a rounded cap 10 of greater diameter than the stem. The rounded cap has a generally concave shape inwardly towards the container. Inward from the cap, the stem has a neck 11, also round though of less diameter than the cap and greater diameter than the stem. The neck extends along the stem for a greater distance than the thickness of the cap. Inward from the neck, the stem has a shoulder 12. The shoulder has a frusto-conical shape with an inner diameter slightly more than the neck and an outer diameter extending beyond that of the cap. The shoulder has a length along the stem approximately that of the cap.

Further describing the stem, between the shoulder 12 and the threaded end 10 of the stem 9, an aerator section, generally at 13, extends radially from the stem proximate the shoulder. During usage, a gasket 16 secures upon the stem proximate to the aerator section and generally downwardly from the cap 10. Returning to the stem, the aerator section has at least one vane, and the preferred embodiment has three vanes 14 having a helical shape and extending radially from the stem and each vane has an equal spacing from adjacent vanes as later shown in FIGS. 9-11. Though three vanes are shown in the figures, the applicant anticipates that one, two, or more than three vanes also generate a cyclonic flow of air from within the invention. Each vane extends outwardly from the stem starting at a radius comparable to the outer diameter of the shoulder. From the shoulder, the vane extends radially outward and generally into container. The length of the vane increases downwardly from the shoulder. The vane attains a trapezoidal shape when viewed from the side as in FIG. 3. Along the stem below the neck and the shoulder, the vane occupies a similar distance as the neck. At the maximum radius of the vane, or tip, the vane steps radially inward in its length towards the stem forming the triangular shape and integrates into the fin 14c. The integral fin has an outer radius from the stem, generally that of the radius of the opening O, approximately ¾ inch through the bottom B of the container. The fin also has a section of constant radius proportional to the length of the neck. Inside of the constant radius portion, the fin tapers inwardly to the stem providing a trapezoidal shape to the fin when viewed from the side, as here in FIG. 3. The fin also curves in a helical manner with the axis of the helix being parallel to the length of the stem. Each fin's helical manner arises from tapering the thickness of the fin. The fin has its maximum thickness from beneath the vane to beneath the wall of the hopper. The fin has its minimum thickness and slight curvature at the lower end of the constant radius portion. At the end of the constant radius portion, the fins have their radius narrow to that of the stem, forming a generally forty five degree incline of the fin to the stem.

As later shown, the vanes have a leading face and a trailing face. The leading face admits the air flow in the direction of rotation while the trailing face directs the air flow. The trailing face has a curvilinear facet 15, here shown upon the left of FIG. 3 where the shoulder 12 meets the fin 14c. The facet has a base extending for the diameter of the stem and out to the outer diameter of the shoulder. The facet then extends downwardly at an acute angle to the axis of the stem then curves across and downward to the next vane, here shown to the right. The facet spans substantially the space between adjacent vanes. Additionally, the facet bevels radially outward from the stem where the facet becomes thinnest away from the stem and thickens proximate the stem. The bevel further guides the air to rotate when transitioning from the fins to the vanes. Generally the facet has a length slightly more than the length of the shoulder. As before, the fins have a maximum radius, or width, for a snug fit within the opening O that extends through the constant radius portion.

The description continues of the next component of the invention, the gasket. Outwardly from the stem, the aerator section 13 generally, and more particularly the stem above the shoulder, supports a conically shaped gasket 16 upon the interior of the container C proximate the bottom B for inducing vibrations into granular bulk material. The gasket extends outwardly from the neck 11 and away from the cap 10 towards the bottom B. The gasket rests upon the shoulder 12 and bends outwardly from the opening as the handle 11 tightens upon the housing. As air flows through the inlet 7, into the housing 2, and between the fins 14c and vanes 14, the gasket bends upwardly allowing bulk material to flow within the bottom B as variations in air pressure and the inherent resilience of the gasket cause the gasket to flap and introduce vibrations into adjacent particles P of granular bulk material. To minimize warping and permanent deflection of the gasket, the gasket has a plurality of arcuate radial ribs, 17, as later shown in FIGS. 17, 17A and the ribs reach to the perimeter of the gasket. Though the figures show many ribs, the number of ribs can vary. The perimeter of the gasket touches upon an optional wearplate 18 of a diameter greater than the gasket. Trailer operators use a wearplate beneath the gasket when transporting abrasive bulk granular materials. The wearplate reinforces the container wall against wear from abrasive particles dragged against the container wall as the gasket oscillates. The wearplate has a surface contacting the gasket and an opposite surface abutting the inside face of the bottom B. Generally the wearplate is round, planar, and flexible with a centered opening for admitting the fins. For non-abrasive bulk granular materials, such as sugar, flour, and other edibles, trailer operators do not use a wearplate and the gasket oscillates upon the container wall.

The previously described components cooperate in FIG. 3 during usage so that turning of the handle 11 positions the vanes directly upon the interior bottom of the container, or optionally the wearplate, and the integral fins within the opening O in the bottom B and below the bottom of the container inside of the housing. The vanes have a lower edge, as later described, and the positioning of the vanes upon the bottom B, or optionally the wearplate, generally closes any gap 19 beneath the tip of the vanes and the adjacent step in of radius of the fins.

Figure 4:
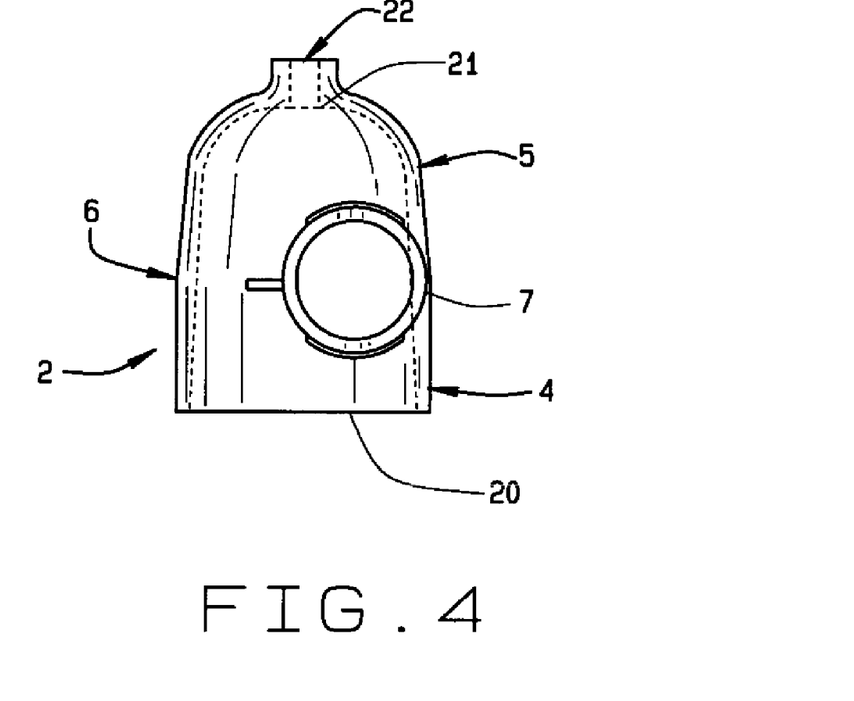
FIG. 4 shows a side view of the housing of the invention with a single port.

With the assembled present invention described, the components of the invention are now further explained. The housing of a single inlet appears in FIG. 4. The single piece housing is generally round and elongated similar to a bell or inverted glass. The housing 2 has an upper portion 4, generally cylindrical in shape, with a mouth 20. The mouth remains open and abuts the washer 3 (not shown) when the housing is installed. The upper portion is generally proximate the bottom B and above the handle 11. Opposite the mouth, the housing transitions from the upper portion to the lower portion 5 at the line 6. The circumferential line 6 indicates a change in the plane of the housing, generally inward to the lower portion to assist in the manufacture of the housing. Again opposite the mouth, the upper portion has half of the inlet 7 in a quadrant of the housing. Then the housing transitions in surface shape below the line 6 so the lower portion has the other half of the inlet 7 in the matching quadrant to the upper portion. The inlet has a slight incline towards the location of the handle and remains tangent to the housing and centered upon the rib. Away from the inlet, the lower portion narrows in diameter and then curves inwardly to form a neck 21, centered upon the length of the housing. The neck extends outwardly from the lower portion and the housing and abuts the handle. The neck has a centered opening 22 for admitting the stem 9, with the threaded end 10 inserted first.

Figure 5:
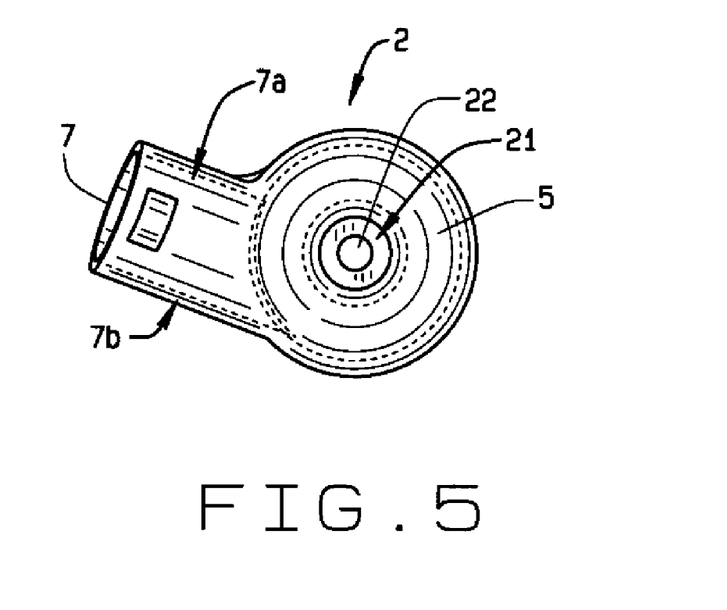
FIG. 5 shows a bottom view of the single port housing.

Turning to the housing, FIG. 5 shows the housing 2 from below the lower portion 5, often as an operator would see this housing. The housing is generally round with the neck 21 centered upon the housing and the opening 22 centered in the neck, generally at the lowest part of the lower portion 5. The inlet 7 extends outwardly from the housing where the axis of the inlet is generally parallel to the diameter of the housing and perpendicular to a radius. The inlet has a width slightly more than the radius of the housing. The inlet is perpendicular to the length of the housing and parallel to the plane of the mouth 20. The inside edge 7a of the inlet is generally parallel to a diameter of the housing and spaced slightly away from a diameter so that a line extended into the housing collinear with the inside edge is slightly away from the center of the neck. The outside edge 7b of the inlet is located slightly inside of a tangent to the outside of the housing. The location of the inlet introduces pressurized air into the housing off center and creates a rotating, or cyclonic, air flow within the housing, preferably counterclockwise, that then rotates past the fins 14c, the vanes 14 and outwardly from beneath the gasket 16. Alternatively, the inlet can be centered upon a radius from the housing so that air may flow directly into the housing to the center without an initial rotation.

Figure 6:
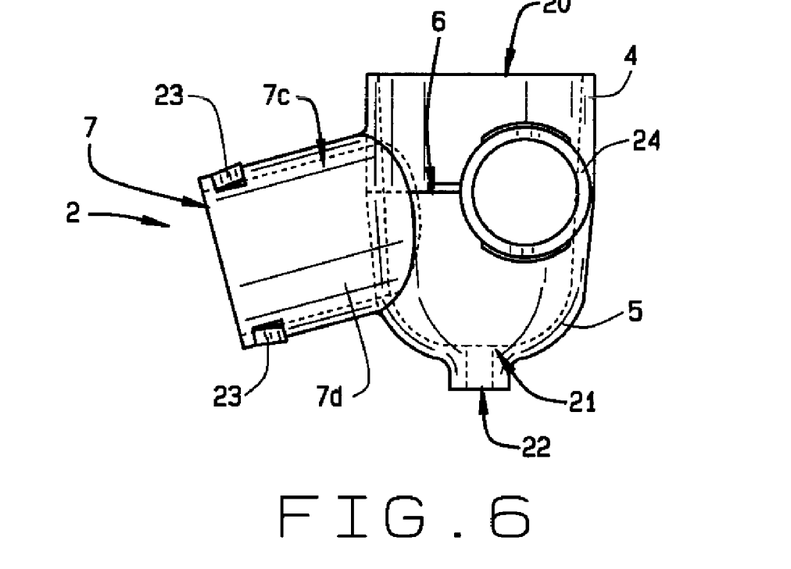
FIG. 6 shows a side view of the housing of the invention with three ports.

The alternate embodiment of the present invention has a housing with an inlet and two outlets shown in FIG. 6. The housing is generally round and elongated similar to the preferred embodiment described above. The housing 2 has an upper portion 4, generally cylindrical in shape, with a mouth 20. The mouth remains open and abuts the washer, or housing gasket 3 (not shown) when the housing is installed. The upper portion as before generally abuts the bottom B and appears as an operator would view it in the field. Opposite the mouth, the upper portion transitions to a lower portion 5 at the circumferential line 6 as before. Again opposite the mouth, the upper portion has a portion 7c of the inlet 7 generally extending at an angle towards the handle. In this embodiment, the inlet has a diameter greater than that of the preferred embodiment as in FIGS. 4, 5. The inlet extends outward from the housing for at least the radius of the housing. The inlet has a plurality of teeth 23 upon the perimeter opposite the housing for gripping a hose F or other fitting, not shown. The upper portion has half of the first outlet 24 in a quadrant of the housing and upon an axis perpendicular to the first inlet 7. Then the housing transitions to the lower portion 5 that has a partially spherical, or bell shape, below the line 6. The lower portion has a round shape of similar diameter to the upper portion opposite the mouth. The lower portion has the other portion 7d of the inlet 7 also extending at an angle towards the handle. The other portion 7d has the majority of the inlet. When assembled, the inlet attains an approximately 15 degree angle towards the handle with the inner edge of the inlet locating upon the plane of the line 6. The other portion 7d is generally located below the plane of the line 6. As before, the lower portion has a half of the first outlet 24 in the matching quadrant to the upper portion. Away from the inlet, the lower portion narrows in diameter and then curves inwardly to form a neck 21, centered upon the length of the housing and the lower portion. The neck extends outwardly from the lower portion and the housing and abuts the handle. The neck has a centered opening 22 for admitting the stem 9, threaded end 10 first.

Figure 7:
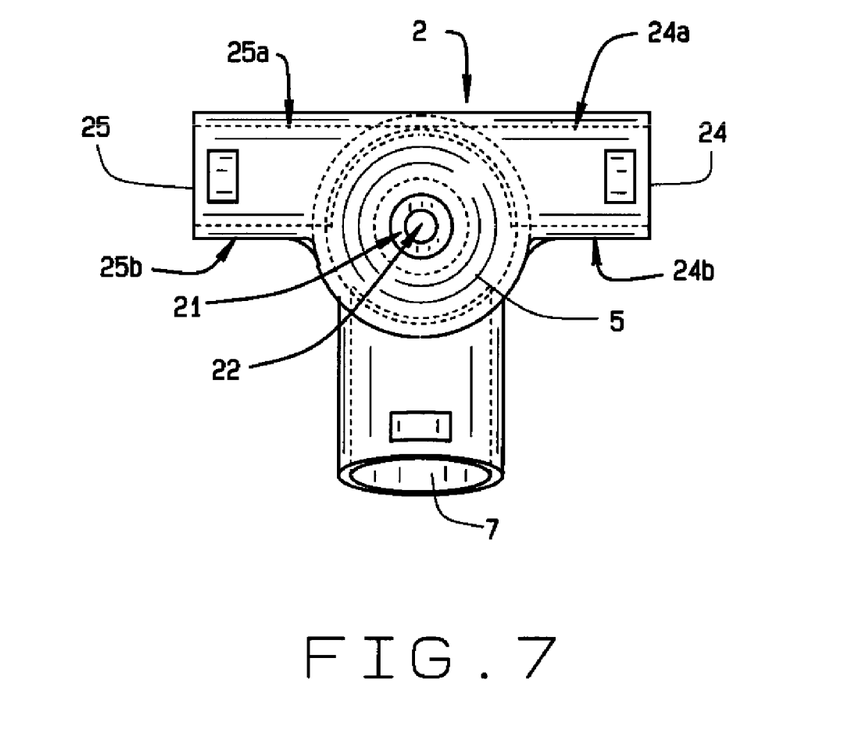
FIG. 7 describes a bottom view of the three port housing.

Turning the housing, FIG. 7 shows the one inlet and two outlets, or guide tubes, embodiment of the housing 2 from below the lower portion 5, often as seen in the field. This embodiment generally receives pressurized air, approximately 20-25 psi, from a main line, as at F, through the inlet 7 that is then distributed through the remaining two outlets. The remaining two outlets communicate air to two single inlet housings, as previously shown in FIGS. 4, 5, when three housings are located at the bottom B of a container as is common in the field. The housing is generally round with the neck 21 centered upon the housing and the opening 22 centered in the neck. The inlet 7 extends outwardly and radially from the housing where the axis of the inlet is generally perpendicular to the diameter of the housing and through the center of the housing. The inlet has a width slightly less than the diameter of the housing. The inlet is perpendicular to the length of the housing but tipped below the plane of the mouth 20 at approximately 15 degrees.

Opposite and perpendicular to the inlet 7, the housing has the first outlet 24. The inside edge 24a of the first outlet passes through the diameter of the housing while the outside edge 24b of the first outlet is located tangent to the radius of the housing. Opposite the first outlet 24, the housing has the second outlet 25 generally coaxial with the first outlet and perpendicular to the inlet. The second outlet generally has the same diameter as the first outlet. Mirroring the first outlet, the inside edge 25a of the second outlet also passes through the diameter of the housing while the outside edge 25b of the second outlet is generally tangent to the radius of the housing. In the preferred embodiment, the outside edges 24b, 25b of the first outlet 24 and the second outlet 25 generally form a common surface tangent to the housing. The location of the first and second outlets distributes air from the housing off center into lines for single inlet housings. The off center location of the first and second outlets then creates a rotating air flow within the housing that then rotates outwardly from the fins, the vanes and then beneath the gasket 16, preferably counterclockwise, vibrating and fragmenting bulk material above the invention within the container C. Alternatively, the first and second outlets may be located upon a diameter of the housing.

Figure 8:
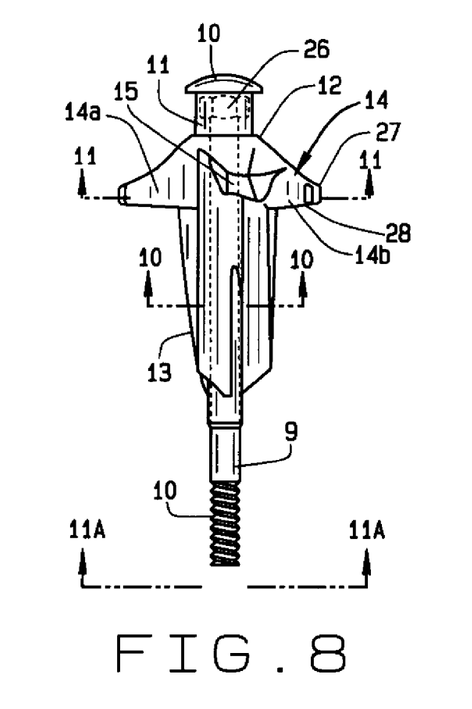
FIG. 8 illustrates a side view of the aerator stem of the present invention.

Moving inwardly from the housing, FIG. 8 describes the aerator section 13 of the invention for vibrating bulk material. The aerator begins with an elongated stem 9, generally round and of solid cross section. The stem has a threaded end 10 that generally extends outwardly of the housing. Away from the threaded end 10, the stem extends nearly a third of its length at a constant diameter. Opposite the threaded end, the stem 9 has a rounded cap 10 of generally concave shape inwardly towards the container and of a diameter greater than the diameter of the stem. Downwardly in this figure; or inward along the stem from the cap, the stem has a neck 11, also round though of less diameter than the cap and greater diameter than the stem. In this view, the neck has a nut 26 contained therein. The nut fits within a hexagonal shaped interior chamber of the neck where the chamber retains the nut within the neck. Downwardly in this figure and also inward along the stem from the cap, the neck extends along the stem more than the thickness of the cap. Below from the neck in this figure, the stem has a shoulder 12 around the perimeter of the stem. The shoulder has a frusto-conical shape with an inner diameter slightly more than the neck and an outer diameter extending beyond that of the cap. The shoulder has a length along the stem approximately that of the cap.

Between the shoulder 12 and the threaded end 10 of the stem 9, the aerator section 13 extends radially from the stem below the shoulder in this figure. The aerator has at least one vane, and preferably three vanes 14, extending radially from the stem and each vane has an equal spacing from adjacent vanes as shown next in FIGS. 9-11. For clarity, the figures show three vanes however the applicant anticipates that the present invention can also operate with one, two, or more than three vanes. Each vane extends outwardly from the stem, generally tangent to the stem, starting with a radius similar to the outer diameter of the shoulder and that then extends radially outward into container. The vane has an outward edge flush with the frusto-conical surface of the shoulder for a smooth transition from the shoulder to the vanes. Each vane attains an apparent triangular shape when viewed from the side with a beveled tip 27 at the outermost extent of the aerator. The vane has a length along the stem similar to the length of the neck. At the maximum radius of the vane beneath the shoulder at the tip, the vane steps inwards to the stem forming the triangular shape. At this step, the vane returns along an edge 28 towards the stem, similar to the base of a triangle. The edge of the vane gently tapers towards the fin 14c, alternately called a leg, and the edge is nearly perpendicular to the length of the stem.

The fin has a constant radius generally that of the radius of the opening O and also has a length along the stem below the vane greater than that of the length of the neck above the shoulder. Inward of the constant radius portion, the fin tapers to the stem in a trapezoidal shape. Each fin has a thickness generally that of a vane at the edge 28 and then the fin thickness narrows to approximately one half of its thickness at the vane when the fin turns toward the stem at slightly over half the length of the stem. As later shown in FIG. 11A, the fins attain a helical arrangement. Each vane and its depending fin, has a leading face 14a and a trailing face 14b. The leading face admits the air flow from the opening and along a fin directing the air flow into rotation within the housing as previously shown in FIGS. 2, 3. The leading face 14a has an inverted facet 15, here shown upon the left in the drawing, generally as a substantially sinusoidal shape with the high point of the sinusoid where the shoulder 12 meets a vane 14 and the low point of the sinusoid at approximately half of the height of the next vane to the right in the figure. The air flow from the opening impacts upon the facet which redirects the air flow outwardly from the stem leftwards towards the gasket 16, attaining a counterclockwise flow. The facet extends between two adjacent vanes having a radius similar to that of the shoulder 12 and then narrows to the radius of the stem as the facet descends approximately half the height of a vane. The facet has a length along the stem of slightly more than the length of the shoulder along the stem. The fins cooperate to center the aerator in the opening O but occupy minimal area of the opening. For example, in a 1.5 inch diameter opening, the fins, vanes, and stem occupy approximately 0.32 square inches leaving approximately 1.44 square inches for air flow and approximately 81.55% of the area of the opening. This greater percentage of open area allows for more air to enter the gasket and to further fluidize the bulk granular material.

Alternatively, the fins are separate from the vanes. The fins rotate upon a bearing about the axis of the stem. The bearing is generally located at the base of the fins where they join the stem and alternatively a second bearing where the fins abut the vanes. Alternatively the fins may be replaced by a blower, such as a squirrel cage, powered upon a shaft through the stem. Rotation of the fin generates additional air pressure and flow through the opening O and into the vanes, similar to a turbo effect.

The aerator then appears in an end view centered upon the cap 10 in FIG. 9 with the stem below the cap extending into the plane of the figure. The cap 10 is generally round with the vanes 14 extending outwardly from beneath the cap. Each vane curves away from and generally behind a radial line extending from the stem at the interior of each vane. Upon its trailing face 14B, each vane curves towards the shoulder. Outwardly from the stem, each tip 27 has an equal spacing from adjacent tips of approximately 120 degrees. Each tip is generally rotated and curved behind a radial line drawn from the joint of each vane with the stem. Each tip itself has a bevel where the trailing face 14B is slightly shorter than the leading face 14A.

Figure 9:
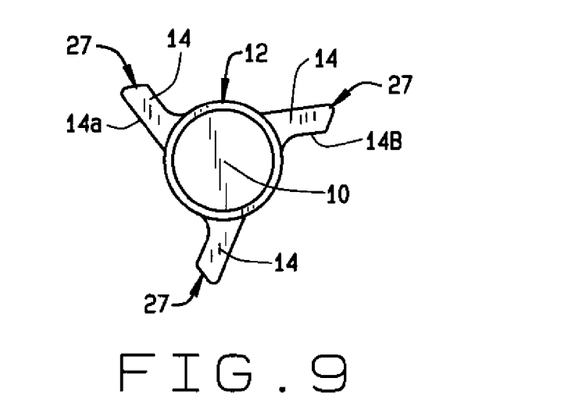
FIG. 9 describes a top view of the aerator stem.
Figure 10:
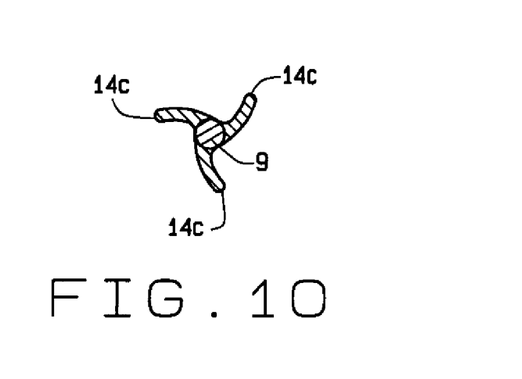
FIG. 10 illustrates a sectional view of the stem through the lower fins.

Opposite the view of the aerator section shown in FIG. 9, FIG. 10 shows the threaded end of the stem with the vanes away in the background, or into the figure and the fins shown in the foreground. The arrangement of the fins takes form in FIG. 10 as a sectional view upward towards the cap through the fins 14c having a constant radius outward from the stem. Each fin is also equally spaced in rotation from adjacent fins, at approximately 120 degrees. Each fin begins as a tangent to the stem and then arcs counterclockwise so that the center of the fin away from the stem returns to a radial line. The fins begin a helical form, or spiral, in combination with the vanes to direct the air flow from the opening into a preferred counterclockwise cyclonic manner beneath the edge of the gasket sweeping the bottom B while the gasket vibrates adjacent particles of bulk granular material to stimulate or accelerate unloading of a tank trailer or other container.

Figure 11:
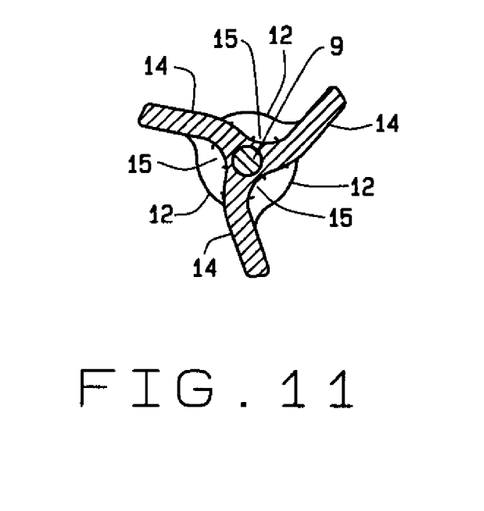
FIG. 11 illustrates a section view of the stem through the upper fins.

Also opposite the view shown in FIG. 9, above the fins and closer towards the cap, FIG. 11 provides a sectional view of aerator section 13 upwards through the vanes 14 where the vanes have a maximum radius, along the edge 28, generally above the step inward to the diameter of the fins. The paths of the facets 15 and the shoulder 12 are shown from below. As before, each vane is equally spaced from adjacent vanes at approximately 120 degrees in a three vane embodiment as shown and also directly above the fins. In embodiments with two or more vanes, the vanes are equally spaced in rotation around the circumference of the stem 9. Equally spacing of vanes provides for balanced flow of air from beneath the entire perimeter of the gasket. Each vane also begins on a tangent to the stem and then arcs counterclockwise in this view. In this view, each vane, in combination with an integral fin, forms a helical shape that guides the air flow from the opening into counter clockwise rotation.

Figure 11A:
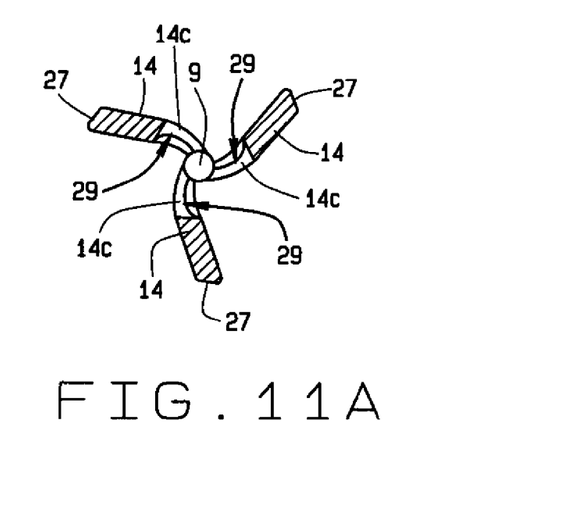
FIG. 11A shows a view looking up the stem from the threaded end through the fins arranged helically.

Each vane also begins on a tangent to the stem and then arcs counterclockwise again in FIG. 11A. In this view, each vane 14, in combination with an integral fin 14c, forms a helical shape that guides the air flow from the inlet 7 to the opening O into counter clockwise rotation. The end of the stem 9 is centered in the foreground of this figure. Outside of the radius of a fin, the vane has a larger thickness than the fin, approximately double that of the fin. The vane has the larger thickness for over half of its own length outwardly from the stem. Proximate the stem and outward to the maximum radius of a fin, the fin has a narrow thickness shown here in solid line generally at the skewed side of the trapezoidal fin shape, that is towards the threaded end 10 of the stem. Then the fin thickens away from the threaded end towards the vane. The thickening of the fin forms a planar scoop 29, that extends upwardly for the length of the fin. The scoop smoothes the transition in thickness of the vane for minimal adverse aerodynamic effect upon air flow passing along the vane. In the foreground of this figure, the fins have their narrowest thickness and the initiation of a helical curve, leftward or counterclockwise. The helical curve continues along the length of the fins towards the vanes.

Figure 12:
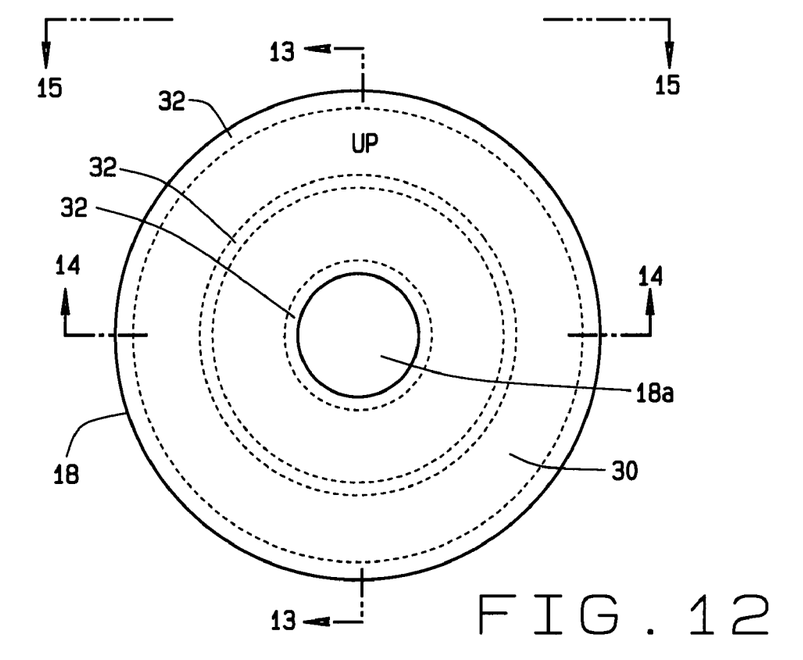
FIG. 12 is a top view of the wearplate of the present invention.

Moving from the housing and the aerator components, the present invention has an optional wearplate shown in FIG. 12. The wearplate 18 is generally round with a central opening 18a of the same diameter as the opening O in the bottom B of a tank trailer previously shown in FIGS. 1, 2, 3. The optional wearplate is used for abrasive bulk granular materials only and has a thin thickness suitable for bending and fitting to the surface of the bottom B. The wearplate has an inner surface 30, generally smooth and made of metal, preferably stainless steel. An indicia, such as "UP", indicates the inner surface that locates away from the bottom, generally towards the interior of the hopper. Opposite the inner surface, the wearplate has an outer surface 31 upon which attaches gasket like material, generally silicone, formed by a plurality of concentric ridges 32. The ridges seal the space between the container and the wearplate thus preventing the accumulation of granular bulk material beneath the wearplate and aberrations in vibration of the gasket and increases in back pressure. In the preferred embodiment, the outer surface has three ridges, a first ridge upon the perimeter of the opening 18a, a second ridge approximately midway between the opening 18a and the perimeter of the wearplate, and a third ridge upon the perimeter of the wearplate. Though three ridges are preferred, alternate numbers of ridges are foreseen by the inventor.

Figure 13:
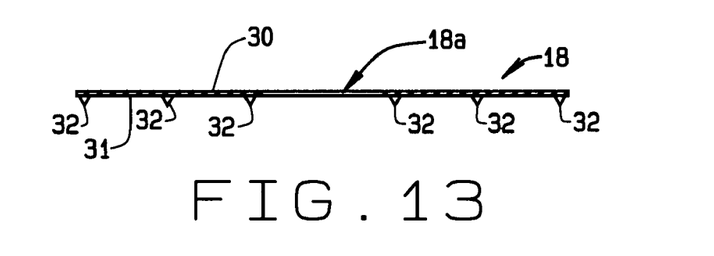
FIGS. 13-15 illustrate various sectional views of the wearplate, FIG. 13 through the center, FIG. 14 through the center perpendicular to FIG. 13, and FIG. 15 from the outer edge.
Figure 14:
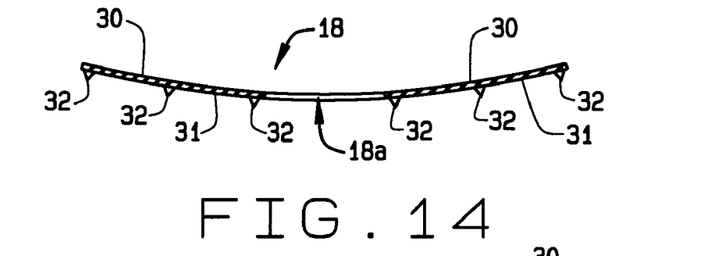
Figure 15:
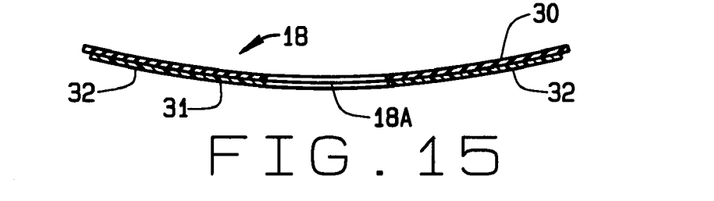

Then the wearplate appears in FIG. 13 in sectional view, generally planar before installation of the present invention in the bottom of the tank trailer or other container. The inner surface 30 generally faces towards the container and the bulk material contained therein. The inner surface provides a smooth area for the gasket 16 upon which to travel as the gasket flexes during fluctuations in air flow and flow of bulk material. Vibration of the gasket as during usage causes the gasket to flap and move radially upon the inner surface of the wearplate. The outer surface 31 generally abuts the bottom B and seals the wearplate upon the bottom through the ridges 32 to prevent leakage of air and bulk material beneath the wearplate. FIG. 14 shows a sectional view of the wearplate when installed in a curved bottom B of the container. The wearplate flexes and bends to follow the profile of the shape of the bottom. Then FIG. 15 shows an end view of the installed wearplate. In this view the perimeter ridge 32 seals the perimeter of the outer surface preventing air and bulk material from flowing beneath the wearplate. The ridges 32 are preferably silicone material adhered to the bottom B with an adhesive.

Figure 16:
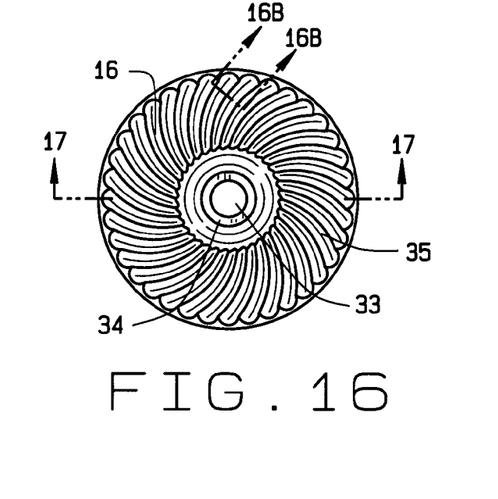

Completing the description of the invention components, FIG. 16 shows the gasket 16 of the present invention from the top as when installed upon a tank trailer or other container. The gasket has a generally round shape of a diameter in excess of that of the opening O of the container and less than that of the wearplate. Upon the interior, the gasket has a centered aperture 33, generally round and of similar diameter as the neck 11 of the stem for a snug fit of the gasket upon the aerator section 13. The aperture extends through the thickness of the gasket. Surrounding the aperture the gasket has a collar 34 for stiffness during flexing of the gasket under air pressure as it vibrates adjacent particles of granular bulk material. The collar has an outer diameter similar to that of the cap 10, thus minimizing collection of bulk materials at the joint of the gasket to the aerator. The collar seeks a generally flush abutment to the cap. Extending radially outwards from the collar to the perimeter of the gasket, a plurality of arcuate finger ribs, as at 35, provide additional stiffness to the gasket as it withstands the weight of adjacent bulk material outside of the gasket and the pressure of air beneath the gasket while the gasket flaps. In the preferred embodiment of the gasket for this invention, the ribs 35 have a curved form beginning at the collar and turning to the right, or clockwise in this view from above the cap. A rib curves rightwardly for approximately three ribs at the perimeter of the gasket. The ribs have equally spacing angularly about the center of the gasket providing for balanced stiffness of the gasket upon its entire perimeter. The ribs have a maximum width at the perimeter of the gasket and narrow in width towards the collar 34. In an alternate embodiment, the ribs have a straight form that tapers from the perimeter of the gasket towards the collar.

Figure 16A:
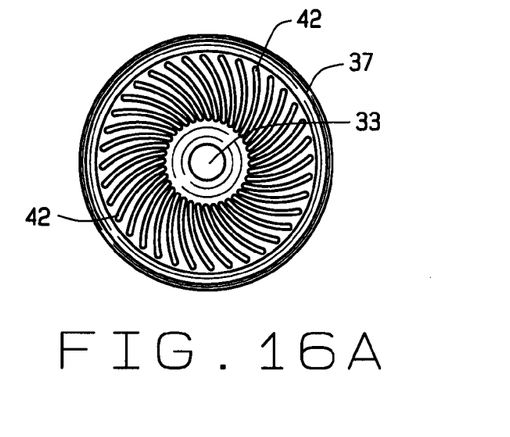
FIG. 16A shows a cross section of a rib stiffening the gasket.

In the preferred embodiment, the gasket has approximately thirty six finger ribs. Though thirty six ribs are shown, the applicant anticipates that the number of ribs can vary and still stiffen the gasket. Additionally, the ribs in cooperation with the angles of the edge of the gasket cooperate so that the gasket grips the bottom B firmly thus minimizing bulk material passing below the gasket. Turning the gasket over, FIG. 16A shows a bottom view of the gasket 16 where the bottom of the gasket adjoins the wall of the container. As in the top view, the bottom of the gasket has a collar 34 with the aperture 33 for receiving the neck of the stem. Outwardly from the collar, the gasket has a plurality of arcuate flutes 42 also having a curved form beginning at the collar and turning to the left, or counterclockwise in this view looking up to the cap. Each flute 42 curves leftwardly for approximately two flutes and extend to just short of the perimeter of the gasket. Each flute has a thickness as later shown in FIG. 16B. Adjacent flutes are spaced apart approximately four thicknesses at their location short of the gasket perimeter and narrowing to one thickness proximate the collar. The flutes are spaced apart equally angularly about the center of the gasket providing for counterclockwise airflow concentrated by the flutes around the entire perimeter of the bottom of the gasket.

Figure 16B:
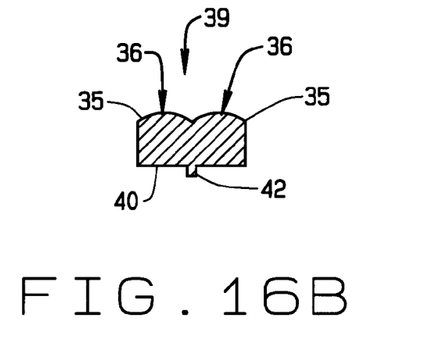
FIG. 16B provides a bottom view of the gasket of the present invention where the gasket directs the air flow out from under the rubber gasket in a cyclonic effect to sweep the hopper; and, FIG. 17 shows a sectional view of the gasket

Each rib, on the top of the gasket, has the same shape throughout the gasket as shown by the sectional view of FIG. 16B. A rib has a generally convex or rounded surface 36 extending outwardly from the remainder of the adjacent gasket, here shown in rectangular form. The rounded surface extends perpendicular to the surface of the gasket and into the bottom B of the tank trailer or other container. The rounded surface has a generally arcuate shape that transfers pressure from the bulk material upon the gasket to adjacent ribs, like the two ribs 36 shown here, similar to the functions of an arch. This transfer of pressure places the gasket into compression and stiffens the gasket against the weight of the bulk material thereon. Opposite the ribs, the bottom of the gasket has flutes 42. Each flute is generally below where two ribs adjoin and generally follows below the curvature of the ribs. The flute has a generally rectangular cross section of four edges where three edges remain exposed to the air flow and the fourth edge joins with the bottom or under side of the gasket. Each flute is substantially narrower in width that a rib upon the top side.

Figure 17:
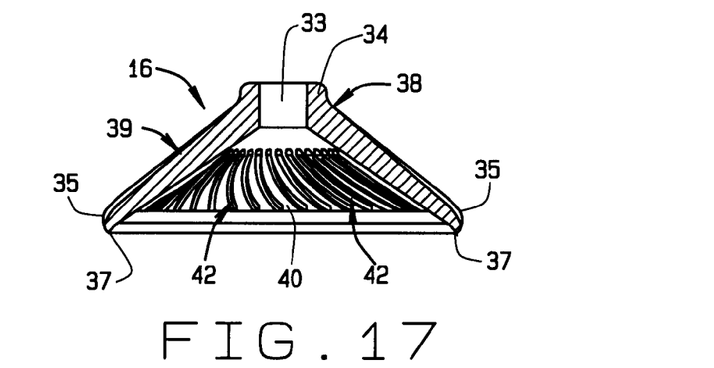

The geometry of the gasket 16 is also shown in FIG. 17. Though round in top view, the gasket in a side sectional view has a frusto-conical shape with the collar 34 at a higher elevation than the perimeter of the gasket, here shown as an edge 37. At the collar, or apex, of the frusto conical shape, the gasket has the aperture 33 extending through the gasket for the length of the neck 11 shown in FIG. 3. The aperture is surrounded upon its perimeter by the collar 34 that extends slightly above and outwardly from the apex of the frusto conical shape. The collar then attains the maximum thickness of the gasket, as at 38, above the shoulder 12 when installed upon the aerator as previously shown in FIG. 3. The gasket then extends radially outwardly and downwardly from the collar with an outer surface 39, or top, upon which passes the bulk material and an opposite inner surface 40, or bottom or under side, that contains the air flow from the housing. The gasket tapers in thickness from the collar to the edge. The inner surface maintains a constant angle relative to the edge while the outer surface tapers at an angle towards the edge reducing the thickness of the gasket. However, the gasket retains a slightly greater thickness at each rib 35 particularly at the maximum thickness of the rounded surface 36 just short of the edge of the gasket.

During usage, air flow from the housing enters beneath the gasket and flows outwardly from beneath the edge 37. The pressure of the air flow generally deflects the edge upwardly and away from the wearplate and the gasket bends. The air flow exiting the gasket has a counterclockwise rotation imparted by the vanes upon the aerator and concentrated by the flutes 42 upon the bottom of the gasket. The flutes locate around the entire bottom or inner surface of the gasket as in FIG. 17. Opposite the air flow, the bulk material flows against the outer surface 39 of the gasket. Variations in air flow pressure and apparent pressure of the bulk material as it moves upon the gasket cause the gasket to oscillate irregularly, or flap, upon the wearplate as it induces vibrations into granular bulk material nearby.

Figure 17A:
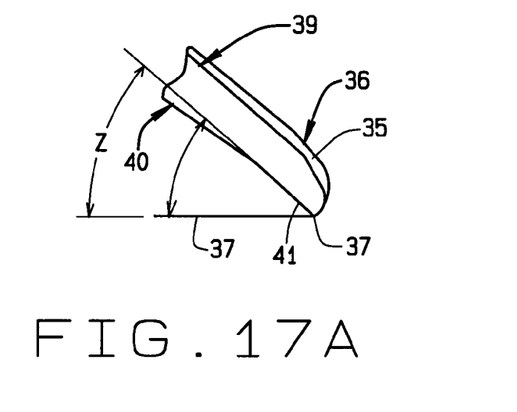
FIG. 17A shows a detailed view of the perimeter of the gasket.

The edge 37 withstands the repeated impact with the wearplate and abrasion of the bulk material through its shaping as shown in FIG. 17a. The inner surface 40 approaches the edge at a second angle to the horizontal of approximately 35 to 45 degrees, and preferably 40 degrees, as at Z. Then proximate the edge 37, the inner surface turns to a sharper first angle of approximately 40 to 50 degrees, and preferably 45 degrees, as at Y. The first angle extends along the inner surface for a length approximately that of the thickness of the gasket. Opposite the inner surface at the first angle, the outer surface 39 has a rib 35 that tapers to the edge 37. The rib has its rounded surface 36 that also rounds over at the edge. The rounding of the rib to the edge minimizes disruption to the air flow, thus maintaining as much laminar flow as possible while minimizing sticking or adhesion of the bulk material upon the edge of the gasket.

In field usage of the invention with various hoppers and other containers, the flexible gasket 16 allows for introduction of additional air pressure and a rotating, or cyclonic, air flow through the present invention 1 into the bulk storage container C. The present invention has less back pressure created beneath the gasket of the present invention. Users of the present invention will likely see at least a 10% decrease in back pressure. Another important feature of the invention comes from the flexible gasket and its edge 37 that allows the introduction of air into the bulk material particles contained within the bulk storage chamber C but does not let the bulk material particles clog or otherwise block the aeration device 1. Also, during wash cycles in cleaning the bulk storage container C, the bulk material particles P will not stick or otherwise become entrapped into the gasket 16, beneath the wearplate 18, or enter the housing 2, as sometimes occurs with prior art devices. The counterclockwise rotation of the air exiting from the edge of the gasket sweeps the bulk material particles outwardly from the gasket and onward for unloading from the bottom B of a hopper upon a tank trailer or other container.

The aerator device inducing cyclonic flow and its various components may be manufactured from many materials, including but not limited to, extruded polymers, steel, aluminum, ferrous and non-ferrous metals, their alloys, polymers, high density polyethylene, polypropylene, silicone, nylon, rubber, ceramics, and composites. The single inlet housing is preferably made of polymer and the single inlet two outlet housing is preferably made of aluminum. The gasket 16 is preferably made from rubber, silicone, nitrile, EPDM, or fluorocarbon, suitable for contact with food ingredients and of sufficient durometer to withstand increased air flow and pressures.

Though this description has referred to air flow in a preferred counterclockwise direction, the present invention can also be constructed so that air exits the gasket in a clockwise direction. This description has also described the inlets and outlets as being located off center of a housing thus allowing flow of air tangential to the housing. The present invention can also be constructed for operation upon air flow introduced radially or axially into a housing, typically from repositioned inlets. Because of the cyclonic flow created by this invention, installed aerators of the present invention stimulate more flow of product during unloading of tank trailers and bulk granular materials have increased fluidity for transmission through various unloading systems.

Variations or modifications to the subject matter of this development may occur to those skilled in the art upon review of the invention as described herein. Such variations, if within the spirit of this development, are intended to be encompassed within the scope of the invention as explained. The description of the preferred embodiment and as shown in the drawings, are set forth for illustrative purposes only to show the principle of this aerator device inducing cyclonic flow.

I claim:

1. A device for creating a rotational flow of pressurized air through an opening within a container, the container having a wall, said device vibrating bulk material located within the container adjacent to said device for an increased rate of unloading the bulk material from the container, comprising:
   a housing having at least one inlet and a longitudinal axis;
   an aerator extending axially through said housing and into the opening of the container, said aerator having at least two approximately tangential vanes;
   said aerator having an elongated stem, generally cylindrical, a threaded end extending through said housing opposite the container, and a cap generally opposite said threaded end, said cap having a diameter greater than said stem, a neck generally cylindrical, inward of said cap, and having a diameter less than said cap and greater than said stem, a shoulder inward of said neck towards said threaded end, having a frusto-conical shape with a larger diameter greater than said neck locating towards said threaded end;
   each of said vanes having an inner radius similar to that of the larger radius of said shoulder and an outer radius exceeding the radius of the opening of the container thus each of said vanes has a generally triangular shape;
   each of said vanes having a tip locating outwardly of the opening of the container and furthest from said shoulder, said tip adapting to locate away from the wall of the container forming a gap between said tip and the wall; and,
   each of said vanes then stepping inward in radius from said tip to a radius approximately that of the opening of the container forming a contiguous fin, each of said fins extending along said stem towards said threaded end at a constant radius from said stem then tapering to said stem wherein said fin has a generally trapezoidal shape, each of said fins having a maximum thickness proximate said vane and a minimum thickness opposite said vane wherein said fin has helical orientation; and,
   a gasket fitting upon said aerator within the container generally opposite said housing, said gasket vibrating within said container.

2. The rotational air flow device of claim 1 further comprising:
   each of said vanes being equally angularly spaced around said stem and proximate said shoulder.

3. The rotational air flow device of claim 2 further comprising:
   said vanes curving away counterclockwise beneath said cap from a radial line extending from said stem, and said fins curving away counterclockwise from a radial line extending from said stem contiguous with said vanes and beneath said cap; and,
   said vanes cooperating with said fins in guiding air along said aerator to rotate counterclockwise upon exiting said gasket.

4. The rotational air flow device of claim 2 further comprising:
   said vanes curving away clockwise beneath said cap from a radial line extending from said stem, and said fins curving away clockwise from a radial line extending from said stem contiguous with said vanes and beneath said cap; and,
   said vanes cooperating with said fins in guiding air along said aerator to rotate clockwise upon exiting said gasket.

5. The rotational air flow device of claim 2 further comprising:
   said aerator having three of said vanes.

6. The rotational air flow device of claim 1 further comprising:
   said inlet being perpendicular to said housing, offset from the center of said housing, and tilting slightly away from said gasket; and,
   said inlet approaching said housing along an axis parallel to the diameter of said housing;
   wherein said inlet induces air to rotate within said housing.

7. The rotational air flow device of claim 6 further comprising:
   said aerator having an elongated stem, generally cylindrical, a threaded end extending through said housing opposite the container; and,
   said housing having a mouth abutting the container, a closed bottom opposite said mouth, and an aperture upon said bottom and upon the longitudinal axis of said housing, said aperture admitting said threaded end of said aerator.

8. The rotational air flow device of claim 1 further comprising:
said housing having an inlet generally centered upon a radius of said housing, and a first outlet coaxial with a second outlet, said first outlet and said second outlet defining a plane;
said inlet being perpendicular to said housing, said inlet approaching said housing along an axis at an angle to the plane defined by said first outlet and said second outlet, wherein said inlet supplies air to said housing;
said first outlet being perpendicular to said inlet and said housing and offset from the center of said housing, said first outlet departing said housing along an axis parallel to the diameter of said housing, wherein said first outlet induces air to rotate within said housing; and,
said second outlet being perpendicular to said inlet and said housing, opposite said first outlet and coaxial with said first outlet, and offset from the center of said housing, said second outlet departing said housing along an axis parallel to the diameter of said housing, wherein said second outlet induces air to rotate within said housing.

9. The rotational air flow device of claim 8 further comprising:
said aerator having an elongated stem, generally cylindrical, a threaded end extending through said housing opposite the container; and,
said housing having a mouth abutting the container, a closed bottom opposite said mouth, and an aperture centered upon said bottom and upon the longitudinal axis of said housing, said aperture admitting said aerator.

10. The rotational air flow device of claim 9 wherein said housing supplies air to at least one other housing having at least one inlet.

11. The rotational air flow device of claim 1 further comprising:
said gasket having a frusto-conical shape including an apex and an opposite edge, said gasket connecting at its apex to said aerator within the container, and said gasket having an inner surface and an opposite outer surface generally positioning towards said container.

12. The rotational air flow device of claim 11 further comprising:
said gasket having a collar at the apex and an aperture through said collar for engaging a certain portion of said aerator, said collar extending above said outer surface, a maximum thickness of said gasket proximate said collar, a minimum thickness proximate said edge, said edge locating upon the perimeter of said gasket opposite said collar.

13. The rotational air flow device of claim 12 further comprising:
said gasket having a plurality of arcuate finger ribs extending upon said outer surface from said collar to said edge orienting counterclockwise, each of said ribs widening outwardly from said collar, each of said ribs having a minimum thickness proximate said collar and a maximum thickness proximate said edge; and,
said gasket having a plurality of arcuate flutes extending upon said inner surface from said collar to said edge orienting counterclockwise, each of said flutes having a constant width generally less than the width of one of said finger ribs, each of said flutes locating opposite the juncture of two of said finger ribs, and each of said flutes ending short of said edge.

14. The rotational air flow device of claim 13 further comprising:
each of said ribs tapering in thickness at said edge.

15. The rotational air flow device of claim 14 further comprising:
each of said ribs having a convex stiffening surface outwardly from said gasket.

16. The rotational air flow device of claim 1 wherein air enters said device through said inlet, said inlet initiates a counterclockwise rotation of air within said housing, said fins turn and accelerate said airflow, said vanes further accelerate the airflow counterclockwise, and said gasket releases the rotating air radially from said device while said gasket vibrates.

17. The rotational air flow device of claim 1 further comprising:
a wearplate locating within the container and beneath said gasket, centered upon said aerator and said gasket, and extending outwardly of said gasket.

18. A device creating a rotational flow of pressurized air through an opening within a container, the container having a wall, said device vibrating bulk material located within the container adjacent to said device for an increased rate of unloading the bulk material from the container, comprising:
a housing having at least one substantially tangential inlet and a longitudinal axis wherein said inlet induces rotation of air within said housing, said inlet being generally perpendicular to said housing and tilting slightly away from said gasket;
an aerator extending axially through said housing and into the opening of the container, said aerator having at least two approximately tangential vanes; and,
a gasket fitting upon said aerator within the container generally opposite said housing, said gasket vibrating within said container when subjected to the rotational air.

19. The rotational air flow device of claim 18 further comprising:
said gasket having an apex and an opposite edge, said gasket connecting at its apex to said aerator within the container, and said gasket having an inner surface and an opposite outer surface generally positioning towards said container;
said gasket having a plurality of arcuate finger ribs extending upon said outer surface from said collar to said edge orienting counterclockwise, each of said ribs widening outwardly from said collar, each of said ribs having a minimum thickness proximate said collar and a maximum thickness proximate said edge; and,
said gasket having a plurality of arcuate flutes extending upon said inner surface from said collar to said edge orienting counterclockwise, each of said flutes having a constant width generally less than the width of one of said finger ribs, each of said flutes locating opposite the juncture of two of said finger ribs, and each of said flutes ending short of said edge.

20. The rotational air flow device of claim 18 further comprising:
said gasket having a apex and an opposite edge, said gasket connecting at its apex to said aerator within the container, and said gasket having an inner surface and an opposite outer surface generally positioning towards said container;
said gasket having a plurality of arcuate fingered ribs extending upon said outer surface from said collar to said edge orienting clockwise, each of said ribs widening outwardly from said collar, each of said ribs having a minimum thickness approximate said collar and a maximum thickness approximate said edge; and said gasket having a plurality of arcuate flutes extending upon said inner surface from said collar to said edge orienting clockwise, each of said flutes having a constant width generally less than the width of one of said finger ribs, each of said flutes locating opposite the juncture of two of said finger ribs, and each of said flutes ending short of said edge.

21. The rotational air flow device of claim 18 further comprising:

said gasket having a apex and an opposite edge, said gasket connecting at its apex to said aerator within the container, and said gasket having an inner surface and an opposite outer surface generally positioning towards said container;

said gasket having a plurality of arcuate finger ribs extending upon said outer surface from said collar to said edge orienting in one of a counterclockwise and clockwise direction, each of said ribs widening outwardly from said collar, each of said ribs having a minimum thickness proximate said collar and a maximum thickness proximate said edge; and said gasket having a plurality of arcuate flutes extending upon said inner surface from said collar to said edge orienting in a direction one of counterclockwise and clockwise, each of said flutes having a constant width generally less than the width of one of said finger ribs, each of said flutes locating opposite the juncture of two of said finger ribs, and each of said flutes ending short of said edge.

* * * * *